US008259815B2

(12) United States Patent
Lee et al.

(10) Patent No.: US 8,259,815 B2
(45) Date of Patent: Sep. 4, 2012

(54) ENCODING AND DECODING TRAFFIC INFORMATION USING ENCODING FIELDS

(75) Inventors: Sang Hyup Lee, Seoul (KR); Kyoung Soo Moon, Seoul (KR); Jun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1619 days.

(21) Appl. No.: 11/420,447

(22) Filed: May 25, 2006

(65) Prior Publication Data

US 2006/0267794 A1 Nov. 30, 2006

Related U.S. Application Data

(60) Provisional application No. 60/684,972, filed on May 27, 2005.

(30) Foreign Application Priority Data

Oct. 19, 2005 (KR) .................. 10-2005-0098759

(51) Int. Cl.
*H04B 1/66* (2006.01)
*H04N 7/12* (2006.01)

(52) U.S. Cl. ............................. 375/240.26; 375/240.01

(58) Field of Classification Search ............... 340/995.1, 340/995.11, 995.13, 995.14, 995.15, 995.18, 340/995.19, 995.23, 905, 539, 907, 993, 340/901, 988; 370/310, 312, 474, 216; 701/210, 701/209
See application file for complete search history.

(56) References Cited

U.S. PATENT DOCUMENTS

| 6,477,459 | B1 * | 11/2002 | Wunderlich | ................. 701/209 |
| 7,251,558 | B1 * | 7/2007 | McGrath | ....................... 701/117 |
| 7,355,528 | B2 * | 4/2008 | Yamane et al. | .......... 340/995.13 |
| 2003/0102986 | A1 * | 6/2003 | Hempel et al. | ................. 340/905 |
| 2003/0137438 | A1 * | 7/2003 | Yokose | ......................... 341/106 |
| 2006/0045141 | A1 | 3/2006 | Lee et al. | |
| 2008/0212683 | A1 * | 9/2008 | Nakata et al. | ............ 375/240.23 |

FOREIGN PATENT DOCUMENTS

| KR | 10-2004-0018872 | 3/2004 |
| KR | 10-2004-0064852 | 7/2004 |
| KR | 10-2006-0063563 | 6/2006 |
| KR | 10-2006-0063629 | 6/2006 |
| WO | WO 2006/062324 | 6/2006 |

OTHER PUBLICATIONS

International Search Report and Written Opinion dated Oct. 19, 2006 for Application No. PCT/KR2006/001978, 6 pages.

* cited by examiner

*Primary Examiner* — Behrooz Senfi
(74) *Attorney, Agent, or Firm* — Fish & Richardson P.C.

(57) ABSTRACT

A method for identifying traffic information includes receiving traffic data including a first identifier, information that is encoded, and information corresponding to a field indicative of an encoding scheme. The first identifier enables a determination of a type of information that is included within the received traffic data. The method also includes determining a type of information included within the received traffic data based on the first identifier and determining encoding information based on the field indicative of an encoding scheme included in the received traffic data only if the first identifier enables a determination that the received traffic data includes a field indicative of an encoding scheme. The method further includes identifying the information that is encoded based on the determined encoding information.

21 Claims, 6 Drawing Sheets

```
<cti_component (8A)>:=
    <intunti>(id),          : Identifier, id=8A
    <intunti>(n),           : Length, n, of component data in bytes
    <cti02>,                : Language code
    <short_string>;         : Additional Information
                                                    4d  4c  4b  4a
```

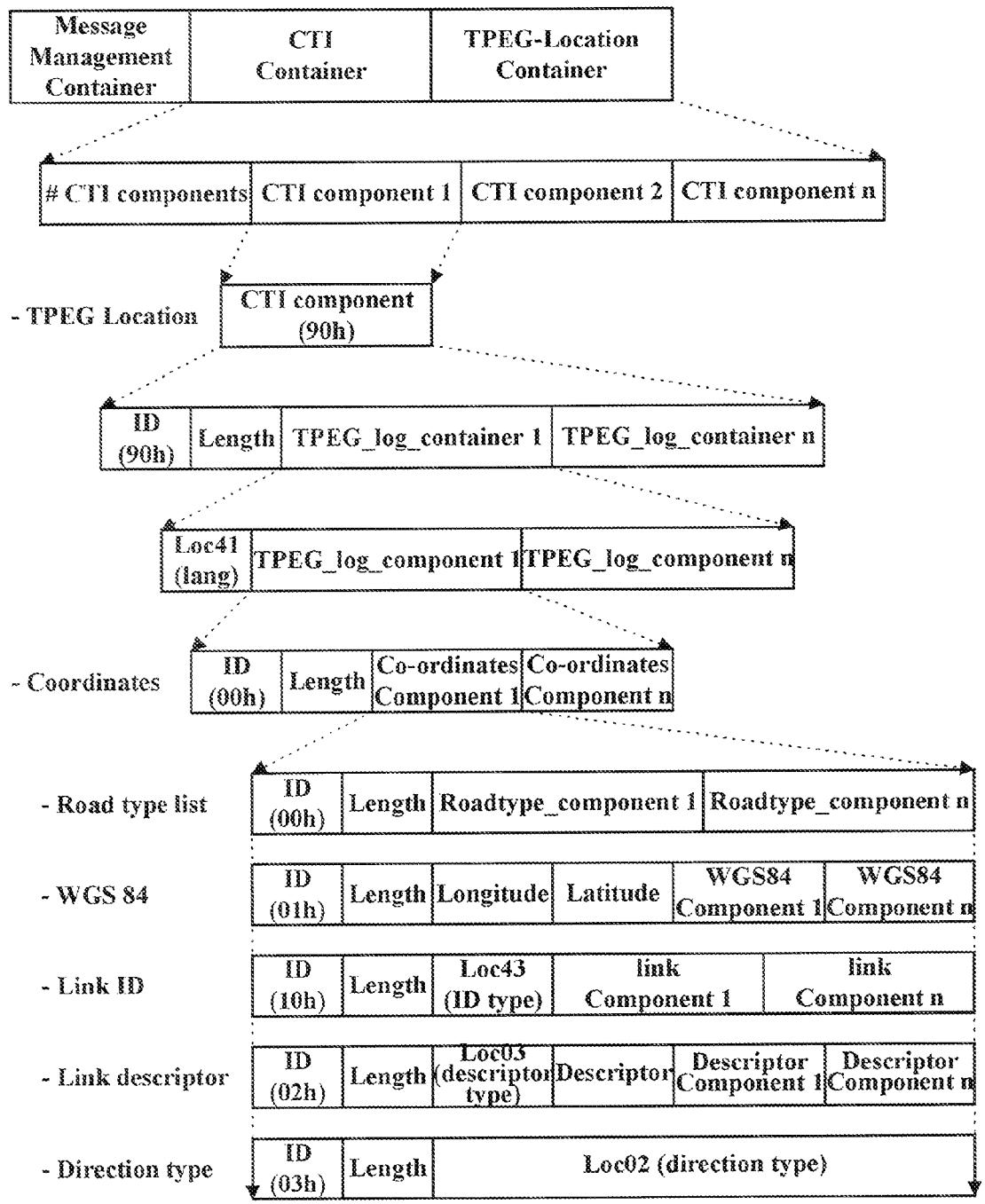

FIG. 6

```
<co-ordinates_component (02)>:=
    <intunti>(id),              : Identifier, id=02
    <intunti>(n),               : Length, n, of component data in bytes
    <loc03>,                    : Descriptor Type
    <short_string>(name),       : Descriptor
    m*<descriptor_component>;   : Descriptor components
```
                                                        6e  6d  6c  6b  6a

FIG. 7

Character Table Identifier

```
<chartab>:=                     : Character Table Identifier
    <intunti>(t);               : Table used, t, according to Annex A
```

Reference Character Table Index (Annex A)

| t = Char-Tab | k = bytes/char | Name of Character Table |
|---|---|---|
| 0 | - | reserved |
| 1 | 1 | ISO 8859-1 (Default) |
| 2 | 1 | ISO 8859-2 |
| 3 | 1 | ISO 8859-3 |
| 4 | 1 | ISO 8859-4 |
| 5 | 1 | ISO 8859-5 |
| 6 | 1 | ISO 8859-6 |
| 7 | 1 | ISO 8859-7 |
| 8 | 1 | ISO 8859-8 |
| 9 | 1 | ISO 8859-9 |
| 10 | 1 | ISO 8859-10 |
| 11 | 1 | reserved |
| 12 | 1 | reserved |
| 13 | 1 | ISO 8859-13 |
| 14 | 1 | ISO 8859-14 |
| 15 | 1 | ISO 8859-15 |
| ... | ... | ... |
| 125 | 1 | Unicode/ISO 10646 UTF-8 |
| 126 | 2 | Unicode/ISO 10646 UTF-16 |
| 127 | 4 | Unicode/ISO 10646 UTF-32 |
| 128 | | reserved |
| ... | ... | ... |
| 255 | | reserved |

FIG. 8

```
<cti_component (8A)>:=
    <intunti>(id),            : Identifier, id=8A
    <intunti>(n),             : Length, n, of component data in bytes
    <cti02>,                  : Language code
    <chartab>,                : Character Table
    <short_string>;           : Additional Information
```

FIG. 9

```
<co-ordinates_component (02)>:=
    <intunti>(id),            : Identifier, id=02
    <intunti>(n),             : Length, n, of component data in bytes
    <loc03>,                  : Descriptor Type
    <chartab>,                : Character Table
    <short_string>(name),     : Descriptor
    m*<descriptor_component>; : Descriptor components
```

FIG. 10

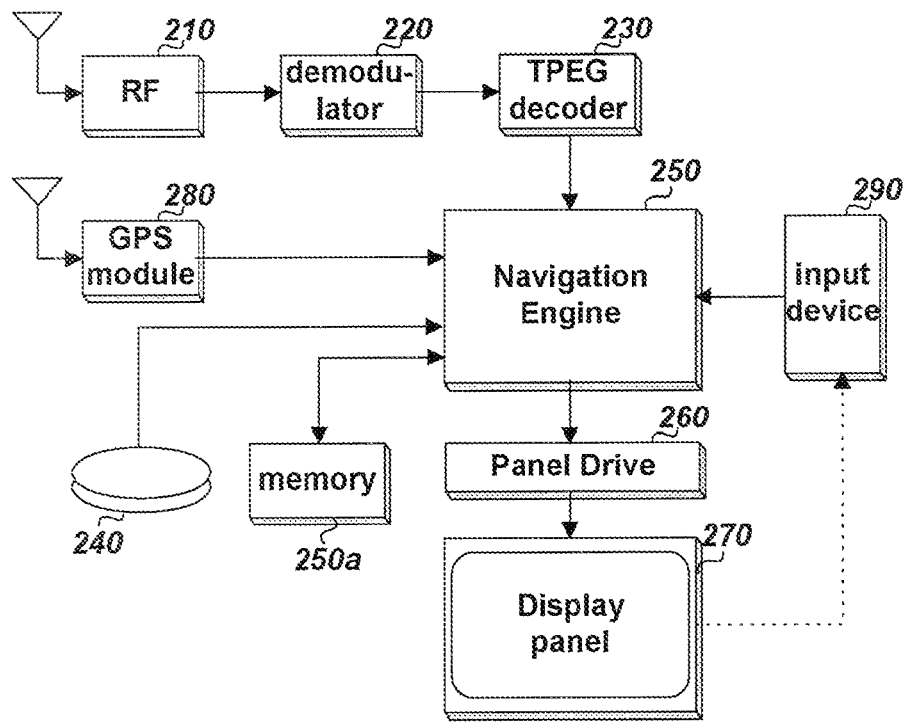

ENCODING AND DECODING TRAFFIC INFORMATION USING ENCODING FIELDS

CROSS-REFERENCE TO RELATED APPLICATIONS

The present application claims priority from U.S. provisional application No. 60/684,972 filed May 27, 2005, titled "Method for supporting character table in transmission of characters," the entire contents of which is incorporated by reference. The present application also claims priority from Korean provisional application 10-2005-0098759 filed Oct. 19, 2005, the entire contents of which is incorporated by reference.

BACKGROUND

1. Field

This disclosure relates to encoding and decoding traffic information using a field indicative of an encoding scheme.

2. Description of the Related Art

With the advancement in digital signal processing and communication technologies, radio and TV broadcasts are being digitalized. Digital broadcasting enables provision of various information (e.g., news, stock prices, weather, traffic information, etc.) as well as audio and video content.

SUMMARY

In one general aspect, a method for identifying traffic information is provided. The method includes receiving traffic data including a first identifier information that is encoded, and information corresponding to a field indicative of an encoding scheme. The first identifier enables a determination of a type of information that is included within the received traffic data. The method also includes determining a type of information included within the received traffic data based on the first identifier and determining encoding information based or the field indicative of an encoding scheme included in the received traffic data only if the first identifier enables a determination that the received traffic data includes a field indicative of an encoding scheme. The method further includes identifying the information that is encoded based on the determined encoding information.

Implementations may include one or more additional features. For instance, determining encoding information may involve accessing information provided within the received traffic data and recognizing that data as the field indicative of an encoding scheme. Determining encoding information may include using the received information corresponding to a field indicative of an encoding scheme to access a reference table and extract a value associated with a method of encoding. The extracted value may include an indication of an amount of data per character associated with the field indicative of encoding scheme. Different values within the field indicative of an encoding scheme may yield different extracted values. The indication of an amount of data per character may be an indication of a number of bytes per character. The extracted value may include, text and different values within the field indicative of an encoding scheme may yield different extracted text. The extracted value include an indication of an amount of data per character and associated text that is associated with field indicative of an encoding scheme. Different values within the field indicative of an encoding scheme may yield different extracted values and associated text.

The method may also include receiving information corresponding to a message management structure including information corresponding to a generation time of information reflected in the traffic data. The generation time included within the received message management structure may relate to a plurality of message component structures that correspond to more than one of a predicted or current traffic tendency, a predicted or current amount of traffic, a predicted or current speed, a predicted or current time to traverse a particular link, or a link descriptor including a field indicative of an encoding mechanism used to encode the link descriptor. Each message component structure corresponding to a link descriptor may further include an identifier specific to the type of information and the first identifier may be an identifier, in a message component structure, corresponding to a link descriptor. A plurality of message component structures corresponding to a link descriptor may be included, and a single field indicative of an encoding mechanism may be used to encode the link descriptors. A plurality of message component structures corresponding to link descriptors may be included. Each link descriptor may be associated with a field indicative of an encoding mechanism used to encode the link descriptor. The plurality of message component structures corresponding to link descriptors may include the same descriptor encoded in a plurality of languages or formats.

Further, in the method, receiving information corresponding to a field indicative of an encoding scheme may include receiving a value, associated within a reference table on a receiving device, with the language or format of a descriptor. Receiving information corresponding to a field indicative of an encoding scheme may include receiving a text descriptor corresponding to a specific link. The text descriptor may be encoded using the encoding method indicated by the field. Receiving traffic data may include decoding the traffic data such that the received traffic data is decoded traffic data. The encoding information may reflect the field indicative of an encoding scheme.

In another general aspect, an apparatus for identifying traffic information is provided. The apparatus includes a decoder configured to receive traffic data including a first identifier, information that is encoded, and information corresponding to a field indicative of an encoding scheme. The first identifier enables a determination of a type of information that is included within the received traffic data. The apparatus also includes a processor configured to determine a type of information included within the received traffic data based on the first identifier and determine encoding information based on the field indicative of an encoding scheme included in the received traffic data only if the first identifier enables a determination that the received traffic data includes a field indicative of an encoding scheme. The processor is also configured to identify the information that is encoded based on the determined encoding information.

Implementation may include one or more additional features. For instance, in the apparatus the processor may be configured to receive traffic data including information corresponding to a version number of information reflected in the traffic data. The version number may be associated with a specific syntax of the data where any one of multiple syntaxes may be used. The processor may be configured to receive information corresponding to a message management structure including information corresponding to a generation time of information reflected in the traffic data. The processor may be configured to receive information corresponding to a data length of the received data.

In a further general aspect, a traffic information communication device is provided. The device includes a data receiving interface configured to receive information that is encoded. The received information includes a number of descriptor components. At least one of the descriptor components includes an encoding scheme component identifier that identifies the descriptor component as a single one of the descriptor components included within the descriptor information, and a field indicative of an encoding scheme identifier configured to identify information associated with the format or language of the descriptor. The device also includes a processing device configured to process the information that is encoded received from the data receiving interface and to determine descriptor information based at least in part on the information received.

The details of one or more implementations a set forth in the accompanying drawings and the description below. Other features will be apparent from the description and drawings, and from the claims.

BRIEF DESCRIPTION OF THE DRAWINGS

FIG. 5 illustrates a transmission format of a location information component included in the CTT event container;

FIG. 6 illustrates a syntax of a link descriptor which is a coordinates component including an ID of 02h;

FIG. 7 illustrates syntax of a character table ID, and a reference character table index;

FIGS. 8 and 9 illustrate syntax of an additional information component and a link descriptor component, each including a field indicative of the encoding scheme of the character string; and FIG. 10 illustrates a structure of a navigation terminal for receiving traffic information from a server.

DETAILED DESCRIPTION

One use for digital broadcast is to satisfy an existing demand for traffic information. Proposals that involve the use of digital broadcasts for this purpose contemplate the use of standardized formatting of traffic information to be broadcast. This approach may be used to enable the use of traffic information receiving terminals made by different manufacturers, which each could be configured to detect and interpret traffic information broadcast in the same way.

Figure 1:
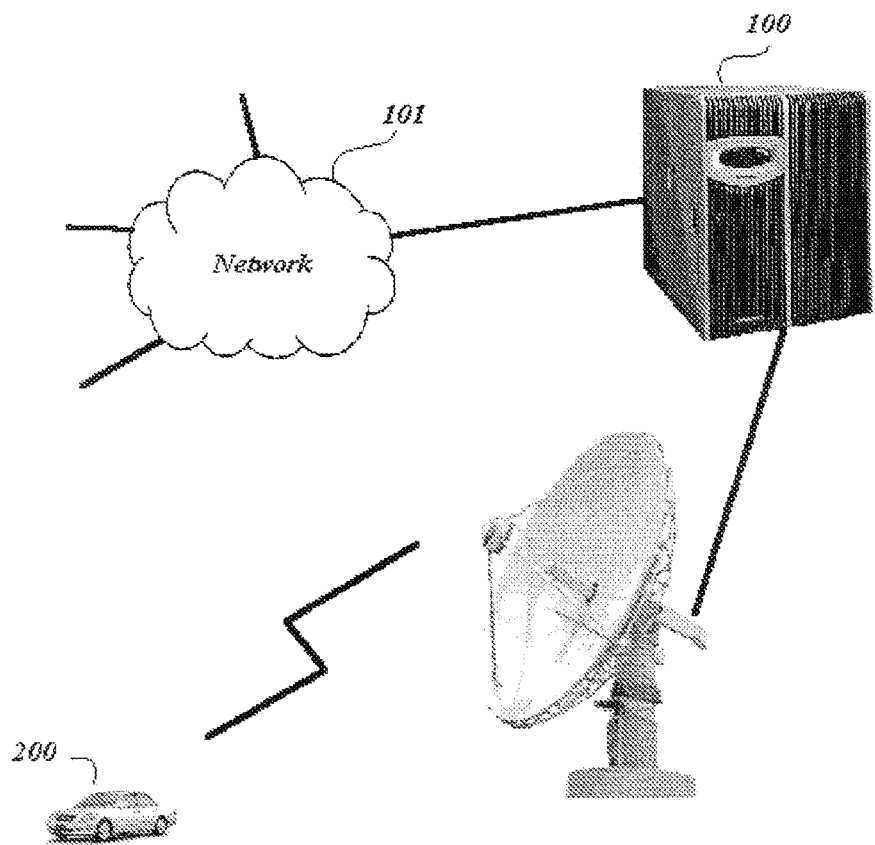
FIG. 1 illustrates a network over which traffic information is provided.

FIG. 1 schematically depicts a network over which the traffic information is provided. In the network 101 of FIG. 1, by way of example, a traffic information providing server 210 of a broadcasting station may reconfigure various congestion traffic information aggregated from an operator's input and may broadcast the reconfigured information by radio so that a traffic information receiving terminal such as a navigation device installed to a car 200 may receive the information.

Figure 2:
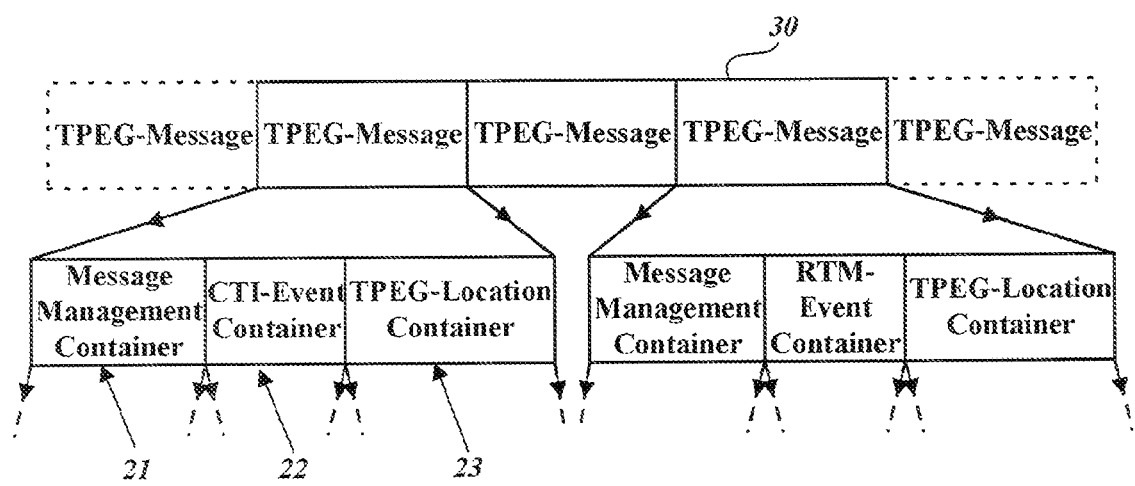
FIG. 2 illustrates a format of the traffic information transmitted by radio.

The congestion traffic information broadcast by the traffic information providing server 100 via radio waves may comprise a sequence of message segments (hereafter, referred to as Transport Protocol Expert Group (TPEG) messages) as shown in FIG. 2. Among the sequence, one message segment, that is, the TPEG message comprises a message management container 21, a congestion and travel-time information (CTT or CTI) event container 22, and a TPEG location container 23. It is noted that a TPEG message 30 conveying traffic information other than the CTT event, e.g., road traffic message (RTM) event, public transport information (PTI), weather information (WEA) may be included in the sequence.

Overall contents relating to the message may be included in the message management container 21. Information relating to a message identification (ID), a version number, date and time, and a message generation time may be included in the message management container 21. The CTT event container 22 may include current traffic information of each link (road section) and additional information. The TPEG location container 23 may include location information relating to the link.

Figure 3:
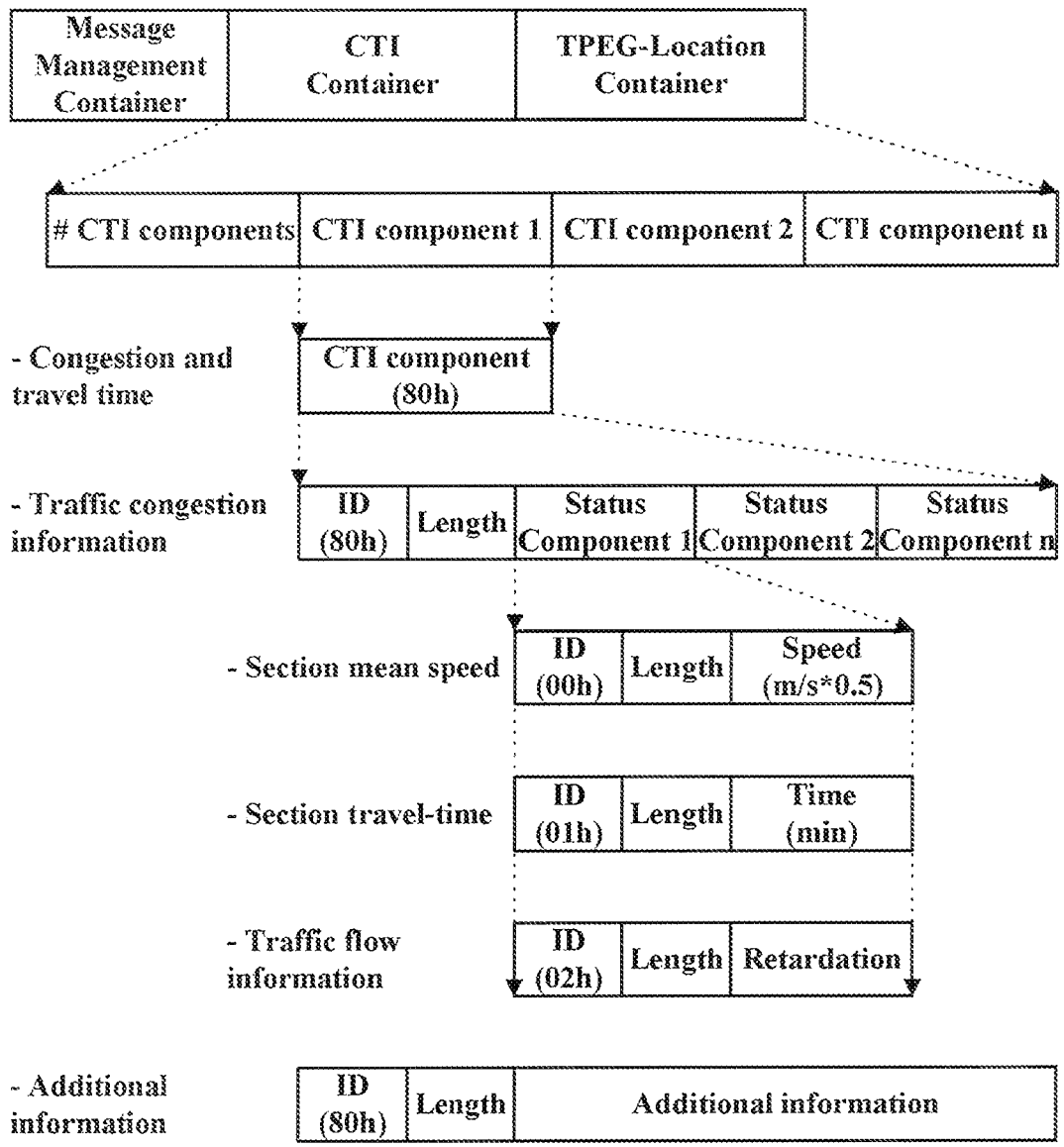
FIG. 3 illustrates a transmission format of a congestion traffic information component included in a CTT event container.

FIG. 3 illustrates an exemplary transmission format of a congestion traffic information component included in the CTT event container.

The CTT event container 22 may comprise a plurality of CTT components. If the CTT component includes the congestion traffic information, the CTT component may be assigned an ID of 80h and may comprise status components indicative of the section mean speed, the section travel-time, and the retardation. In the description, specific IDs are described as assignments to structures associated with specific information. The actual value of an assigned ID (e.g., 80h) is exemplary, and different implementations may assign different values for specific associations or circumstances. Thus, the CTT component may be used to provide various different types of data that may be signaled based on an identifier. For example, FIG. 2B and FIG. 2C illustrate a component with an identifier of 0×80 and 0×90 signaling, respectfully, status and location information.

In various implementations, the ID of 80h is assigned to the congestion traffic information component, more than (m-ary) status components may be included, and a field may be included to represent the total data size of the included status components in bytes.

Status component may include the information relating to the section mean speed, the section travel-time, and/or the retardation. An ID of 00 to the section mean speed, an ID of 01 is assigned to the section travel-time, and an ID of 02 is assigned to the retardation.

Figure 4:
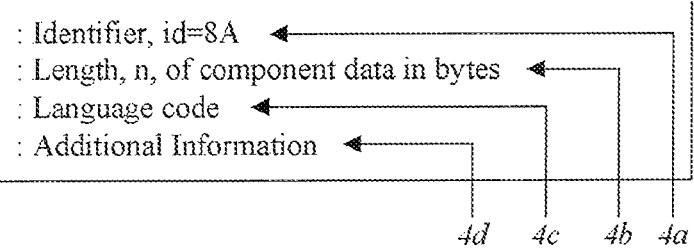
FIG. 4 illustrates syntax of an additional information component included in the CTT event container.

In various implementation, if an ID of 8Ah is assigned, the CTT component may include additional information or auxiliary information relating to the traffic information in a form, such as, for example text. FIG. 4 depicts syntax of the additional information component included in the CTT event container. The additional information component is assigned the ID of 8Ah as indicated by 4a, and may comprise a language code indicated by 4c, additional information configured in text form, i.e., as character sequence or character string indicated by 4d, and a field representing the total data size of the components in bytes as indicated by 4b.

Since the message carried in the CTT event container is subordinate to the location information, the CTT message may include the location information. A transmission target of the TPEG congestion traffic information may include a TPEG decoder including no digital map. Also, for the compatibility with an existing location reference scheme, various location reference schemes may be adapted. One is a location reference method using coordinates transmission, and another is a location reference method using a prescribed node-link ID.

FIG. 5 depicts a transmission format of the location information component included in the CTT event container. If the CTT component includes location information, the CTT component may be assigned an ID of 90h and may comprise more than one TPEG location sub-container TPEG_loc_container.

TPEG location sub-container may comprise one or more TPEG location components TPEG_log_component, and TPEG location component may comprise one or more coordinates components including an ID of 00h.

The coordinates component may carry information relating to a road type such as highway, state road, and so on (a coordinates component including an ID of 00h), coordinates component, which may be represented in, for example, WGS 84 type (a coordinates component including an ID of 01h), link ID information (a coordinates component including an ID of 10h), link descriptor (a coordinates component including an ID of 02h), and direction type information (a coordinates component including an ID of 03h).

FIG. 6 depicts a syntax of the link descriptor which is the coordinates component, according to various implementations, including the ID of 02h. The coordinates component as to the link descriptor may be assigned the ID of 02h as indicated by 6a, and may comprise a field indicative of an encoding scheme type as indicated by 6c, a field indicative of an encoding scheme as indicated by 6d, m-ary descriptor components as indicated by 6e, and a field presenting the total data size of the component in bytes as indicated by 6b. The descriptor may consist of a character string indicative of a geographical name, a building name, a road name, or a station name to represent the corresponding link.

According to an implementation a field indicative of the encoding scheme of the character string may be appended to the component which includes the character string. This field may be recorded as a value (identifier) indicative of a specific encoding scheme in a table where several prescribed character string encoding schemes are organized. The table and the identifier used for the field may conform to a character table and a character table identifier defined in Annex A of EBU B/TPEG TPEG-SSF_3.0/002.

Moreover, through the use of the field, its value, and the corresponding indicated scheme, a terminal which receives and displays the traffic information included in the CTT container may confirm how the character string received together with the traffic information is encoded, for example, whether Hangul (Korean language) is encoded to the complete type, the combination type, or the unicode.

FIG. 7 depicts, according to various implementations, syntax of the character table identifier and a reference character table index that may be defined in Annex A of TPEG-SSF_3.0/002. <chartab> identifies a number 't' arranged in the reference character table index so as to confirm the encoding scheme of the character string and bytes used for one character.

Accordingly, it is possible to use the encoding scheme defined in the reference character table index or to define a new encoding scheme to t=128 through t=255 that a service provider can freely use, for example, complete Hangul, combination Hangul, simplified Chinese, traditional Chinese, Japanese and the like.

FIGS. 8 and 9 depict syntax, according to various implementations, of the additional information component and the link descriptor component that include a field indicative of the encoding scheme of the character string, respectively. In FIGS. 8 and 9, <chartab> is a field where an identifier indicative of the encoding scheme of the following character string <short_string> is recorded. Specifically, one number of the plurality of encoding schemes prescribed in the reference character table index is recorded.

The server 100 may configure the current congestion traffic information and the location information as shown in FIGS. 3 and 5 according to the current traffic information aggregated through several paths and its stored traffic information database, and may transmit the configured information to the traffic information receiving terminal. Additionally, when transmitting a component including the additional information or the link descriptor in relation to the traffic information in the form of the character string, the server 100 may additionally insert an identifier indicative of the encoding scheme of the character string into the component as shown in FIGS. 8 and 9.

When transmitting the same character string in the multi-language or the several encoding schemes, the server 100 may transmit separate components which include the same character string encoded in different encoding schemes. Identifiers indicative of the encoding schemes of the character string included in the components are appended to the corresponding components, respectively.

FIG. 10 depicts an example structure of a navigation terminal installed to a vehicle to receive the traffic information from the server 100. FIG. 10 is an example implementations of a system for receiving and utilizing traffic information. Other systems may be organized differently or include different components.

In FIG. 10, the navigation terminal comprises a tuner 210, a demodulator 220, a TPEG decoder 230, a global positioning system (GPS) module 280, a storage structure 240, an input device 290, a navigation engine 250, a memory 250a, a display panel 270, and a panel driver 260. The tuner 210 outputs the modulated traffic information signal by tuning a signal band over which the traffic information is transmitted. The demodulator 220 outputs the traffic information signal by demodulating the modulated traffic information signal. The TPEG decoder 220 acquires various traffic information by decoding the demodulated traffic information signal. The GPS module 280 receives satellite signals from a plurality of low earth orbit satellites and acquires the current location (longitude, latitude, and height). The storage structure 240 stores a digital map including information about links and nodes, and diverse graphical information. The input device 290 receives a user's input. The navigation engine 250 controls an output to the display based on the user's input, the current location, and the acquired traffic information. The memory 250a temporarily stores data. The display panel 270 displays video. The display panel 270 may be a liquid crystal display (LCD) or organic light emitting diodes (OLED). The panel drive 260 applies a driving signal corresponding to graphical presentation to be displayed to the display panel 270. The input device 230 may be a touch screen equipped to the display panel 270.

The tuner 210 tunes the signal transmitted from the server 100, and the demodulator 220 demodulates and outputs the tuned signal according to a preset scheme. The TPEG decoder 230 decodes the demodulated signal to the TPEG message sequence as configured in FIG. 2, analyzes TPEG messages in the message sequence, and provides the navigation engine 250 with the necessary information and/or the control signal according to the message contents.

The TPEG decoder 230 extracts the data/time and the message generation time from the message management container in each TPEG message, and checks whether a subsequent container is the CTT event container based on the 'message element' (i.e. an identifier). If the CTT event container is following, the TPEG decoder 230 provides the navigation engine 250 with the information acquired from the CTT components in the container so that the navigation engine 250 takes charge of the display of the traffic information. Providing the navigation engine 250 with the information may include determining, based on identifiers, that the traffic information includes a message management container including status, descriptor, or additional information within various message components within the message management container. The components may each include different status, descriptor, or additional information associated with different links or locations and identifiers associated with the different status, descriptor, or additional information. The containers and components may also each include information associated with a generation time version number, data length, and identifiers of included information.

When the additional information component or the link descriptor component in the CTT container is received, the TPEG decoder 230 may provide the navigation engine 250 with the encoding scheme, together with the extracted character string, corresponding to the field value indicative of the encoding scheme so that the character string included in the component may be displayed in conformity with the encoding scheme. To this end, the TPEG decoder 230 manages the reference character table index which defines the encoding scheme of the character string.

The TPEG decoder 230 may acquire location information corresponding to the current traffic information from the subsequent TPEG location container. According to the type information of the TPEG location container, the location information may coordinate (longitude and latitude) of start and end points or the link, i.e., the link ID assigned to the road section.

When the storage structure 240 is equipped, the navigation engine 250 may specify a section corresponding to the received information in reference to the information relating to the links and the nodes in the storage structure 240, and, may, utilize the coordinates of the received link by converting the coordinates to the link ID or converting the link ID to the coordinates.

The navigation engine 250 may read out from the storage structure 240 the digital map of a certain area based on the current coordinates which may be received from the GPS module 280, and may display the digital map on the display panel 270 via the panel drive 260. In doing so, the place corresponding to the current location may be marked by a specific graphical symbol.

The navigation engine 250 may control display of the section mean speed information received from the TPEG decoder 230 in the section corresponding to the coordinates or the link ID of the location container which follows the container carrying the section mean speed information. The section mean speed may be displayed, for example, by changing colors or indicating numbers to the corresponding sections. By way of example of the ordinary road, the red denotes 0~10 km/h, the orange denotes 10~20 km/h, the green denotes 20~40 km/h, and the blue denotes more than 40 km/h.

A terminal without the storage structure 240 storing the digital map may display the section mean speed by colors or by numbers with respect to only links ahead of the current path. In case that the path of the vehicle including the navigation terminal is designated in advance, the section mean speed may be displayed only with respect to the links along the path, rather than the links ahead.

According to the user's request, the navigation engine 250 may control the display panel 270 to display the section travel-time and the retardation of links received from the TPEG decoder 230, instead of or together with the section mean speed.

The navigation engine 250 may receive from the TPEG decoder 230 the information as to the encoding scheme of the character string in the additional information component or the link descriptor component, converts the character string extracted from the additional information component or the link descriptor component according to the encoding scheme, and may display the converted character string on the display panel 270. If a user designates a specific language or encoding scheme, the navigation engine 250 may selectively convert and display the character string the designated encoding scheme amongst the character strings extracted from the several additional information components or link descriptor components.

In light of the foregoing as set forth above, according to the present invention, the character information relating to the traffic may be provided in the multi-language using different character sets, and the information indicative of the display of the transmitted character using which character set may be provided.

Furthermore, since the traffic-related information is provided in the multi-language without modifying the TPEG standard, the TPEG standard may be expanded.

The foregoing description has been presented for purposes of illustration. Thus, various implementations with improvements, modifications, substitutions, or additions within the spirit and scope as defined by the following appended claims.

What is claimed is:

1. A method for processing traffic data at a terminal that includes a receiver and decoder, the method comprising:
   receiving, at a receiver, traffic data including a Transport Protocol Experts Group Message (TPEG-Message) including a message management container, an event container, and a location container; and
   decoding, at a decoder, the received traffic data,
   wherein the event container includes a status component and an additional information component, and the additional information component includes text information and a language code,
   wherein the TPEG-Message further includes first information identifying a specific encoding scheme of a character string of the text information for the additional information component,
   wherein the status component includes a first identifier for identifying the status component, and
   wherein the additional information component includes a second identifier for identifying the additional information component.

2. The method of claim 1, wherein the message management container includes information corresponding to a generation time of information reflected in the traffic data.

3. The method of claim 2, wherein the generation time relates to a plurality of message component structures that correspond to more than one of a predicted or current traffic tendency, a predicted or current amount of traffic, a predicted or current speed, a predicted or current time to traverse a particular link, or a link descriptor including a field indicative of an encoding mechanism used to encode the link descriptor.

4. The method of claim 3, wherein each message component structure corresponding to a link descriptor further comprises an identifier specific to a type of information and the first identifier is an identifier, in a message component structure, corresponding to a link descriptor.

5. The method of claim 3, wherein a plurality of message component structures corresponding to a link descriptor are included, and a single field indicative of an encoding mechanism is used to encode the link descriptors.

6. The method of claim 3, wherein a plurality of message component structures corresponding to link descriptors are included, wherein each link descriptor is associated with a field indicative of an encoding mechanism used to encode the link descriptor.

7. The method of claim 6, wherein the plurality of message component structures corresponding to link descriptors include a descriptor encoded in a plurality of languages or formats.

8. The method of claim 1, wherein the first information includes a value, associated within a reference table on the receiver, with the language or format of a descriptor.

9. The method of claim 1, wherein the TPEG-Message includes a text descriptor corresponding to a specific link, wherein the text descriptor is encoded using the encoding method indicated by the field.

10. An apparatus for processing traffic data, the apparatus comprising:
a receiver configured to receive traffic data including a Transport Protocol Experts Group Message (TPEG-Message) including a message management container, an event container, and a location container; and
a decoder configured to decode the received traffic data,
wherein the event container includes a status component and an additional information component, and the additional information component includes text information and a language code,
wherein the TPEG-Message further includes a first information identifying a specific encoding scheme of a character string of the text information for the additional information component,
wherein the status component includes a first identifier for identifying the status component, and
wherein the additional information component includes a second identifier for identifying the additional information component.

11. The apparatus of claim 10, wherein the message management container includes information corresponding to a version number of information reflected in the traffic data.

12. The apparatus of claim 10, wherein the message management container including information corresponding to a generation time of information reflected in the traffic data.

13. The apparatus of claim 10, wherein the TPEG-Message further includes information corresponding to a data length of the received data.

14. A method for processing traffic data at a terminal that includes a receiver and decoder, the method comprising:
receiving, at a receiver, traffic data including a Transport Protocol Experts Group Message (TPEG-Message) including a message management container, an event container, and a location container; and
decoding, at a decoder, the received traffic data,
wherein the event container includes a status component and an additional information component, and the additional information component includes text information and a language code,
wherein the TPEG-Message further includes a first information identifying a specific encoding scheme of a character string of the text information for the additional information component,
wherein the status component includes a first identifier for identifying the status component,
wherein the additional information component includes a second identifier for identifying the additional information component,
wherein the character string of the text information includes a first character string and a second character string, the first character string being equal to the second character string, and
wherein the first information includes a first field indicative of an encoding scheme of the first character string and a second field indicative of an encoding scheme of the second character string, the first information corresponding to the first field indicative of the encoding scheme of the first character string being different from the first information corresponding to the second field indicative of the encoding scheme of the second character string.

15. The method of claim 1, wherein the first information corresponding to a field indicative of an encoding scheme of the character string includes information indicating a language in which the character string information is encoded.

16. The method of claim 1, wherein the first information corresponding to a field indicative of an encoding scheme of the character string includes information indicating an encoding type of the character string in a particular language.

17. The method of claim 16, wherein the encoding type indicates one of multiple, different types of encoding a character string in the particular language.

18. The method of claim 16, wherein the encoding type indicates that the character string is encoded in at least one of a complete encoding type for the particular language, a combination encoding type for the particular language, and a unicode encoding type for the particular language.

19. The method of claim 18, wherein the encoding type indicates that the character string is encoded in the complete encoding type for the particular language.

20. The method of claim 18, wherein the encoding type indicates that the character string is encoded in the combination encoding type for the particular language.

21. The method of claim 18, wherein the encoding type indicates that the character string is encoded in the unicode encoding type for the particular language.

* * * * *